(12) United States Patent
Sinusas et al.

(10) Patent No.: US 12,202,594 B2
(45) Date of Patent: Jan. 21, 2025

(54) PEAK POWER USE WITH PILOT MONITORING

(71) Applicant: Bell Textron Inc., Fort Worth, TX (US)

(72) Inventors: Eric Albert Sinusas, Southlake, TX (US); Edward Lambert, Lorraine (CA); Yann Lavallee, St-Hippolyte (CA); Aaron Alexander Acee, Flower Mound, TX (US); Albert G. Brand, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 1026 days.

(21) Appl. No.: 17/165,068

(22) Filed: Feb. 2, 2021

(65) Prior Publication Data

US 2021/0253225 A1 Aug. 19, 2021

Related U.S. Application Data

(63) Continuation of application No. 16/054,027, filed on Aug. 3, 2018, now Pat. No. 10,933,980.

(51) Int. Cl.
| | |
|---|---|
| *B64C 19/02* | (2006.01) |
| *B64D 31/06* | (2024.01) |
| *G01C 23/00* | (2006.01) |
| *B64D 45/00* | (2006.01) |
| *B64U 10/17* | (2023.01) |
| *B64U 30/20* | (2023.01) |

(52) U.S. Cl.
CPC .............. *B64C 19/02* (2013.01); *B64D 31/06* (2013.01); *B64D 2045/0085* (2013.01); *B64U 10/17* (2023.01); *B64U 30/20* (2023.01); *G01C 23/00* (2013.01)

(58) Field of Classification Search
CPC B64C 19/02; B64D 31/06; B64D 2045/0085; B64U 10/17; B64U 30/20; G01C 23/00
See application file for complete search history.

(56) References Cited

U.S. PATENT DOCUMENTS

| | | | |
|---|---|---|---|
| 7,031,812 | B1 | 4/2006 | Pettigrew et al. |
| 7,414,544 | B2 | 8/2008 | Oltheten et al. |
| 8,931,732 | B2 | 1/2015 | Sirohi et al. |
| 9,035,802 | B2 | 5/2015 | McCollough et al. |
| 9,174,728 | B2 | 11/2015 | Altmikus et al. |
| 9,194,285 | B2 | 11/2015 | Botti et al. |
| 9,216,816 | B2 | 12/2015 | Fortenbaugh et al. |
| 9,446,842 | B2 | 9/2016 | Luyks |
| 2009/0116155 | A1* | 5/2009 | Almalki .................. F01D 21/00 340/963 |
| 2009/0186320 | A1 | 7/2009 | Rucci et al. |
| 2013/0092789 | A1 | 4/2013 | Botti et al. |

(Continued)

FOREIGN PATENT DOCUMENTS

WO WO-2006081334 A2 8/2006

*Primary Examiner* — Naeem Taslim Alam
(74) *Attorney, Agent, or Firm* — Bradley Arant Boult Cummings LLP

(57) ABSTRACT

An aircraft having an electric motor coupled to a rotor and an instrument electronically connected to the electric motor and configured to communicate a time available value before a motor condition reaches a motor condition limit.

20 Claims, 5 Drawing Sheets

(56) References Cited

U.S. PATENT DOCUMENTS

| | | |
|---|---|---|
| 2016/0041555 A1 | 2/2016 | Bayer |
| 2016/0107748 A1 | 4/2016 | Luyks |
| 2016/0284195 A1 | 9/2016 | Priest et al. |
| 2017/0017241 A1 | 1/2017 | Gillett, Jr. et al. |
| 2017/0297689 A1 | 10/2017 | Lauder et al. |
| 2017/0307401 A1 | 10/2017 | McCollough et al. |
| 2017/0349273 A1 | 12/2017 | Parsons et al. |
| 2017/0349274 A1 | 12/2017 | Fenny et al. |
| 2017/0349276 A1 | 12/2017 | Fenny |
| 2018/0002009 A1 | 1/2018 | McCullough et al. |
| 2018/0002026 A1 | 1/2018 | Oldroyd et al. |
| 2018/0105263 A1 | 4/2018 | Lauder |
| 2018/0111680 A1 | 4/2018 | Fenny et al. |
| 2018/0115265 A1 | 4/2018 | Nayfeh et al. |
| 2019/0140578 A1* | 5/2019 | Lee ..................... B60W 20/12 |
| 2019/0229672 A1* | 7/2019 | Wiedmann ............ H01J 35/101 |
| 2021/0214095 A1* | 7/2021 | Enke ..................... B64D 31/00 |

* cited by examiner

PEAK POWER USE WITH PILOT MONITORING

CROSS-REFERENCE TO RELATED APPLICATION

This application is a continuation of U.S. application Ser. No. 16/054,027, filed Aug. 3, 2018, the contents of which are incorporated by reference in their entirety herein for all purposes.

BACKGROUND

This section provides background information to facilitate a better understanding of the various aspects of the disclosure. It should be understood that the statements in this section of this document are to be read in this light, and not as admissions of prior art.

Aircraft instrumentation continues to improve as more and more flight information becomes available. Terrain elevation data, mapping data, traffic avoidance, and weather information are examples of data that are now routinely provided to pilots during flight. However, as more information becomes available, information overload has increased. It is therefore desirable to limit the display of information to only what is relevant at a given moment. Limiting the relayed information has increased the need for the pilot's display to be intuitive, since the pilot does experience continuous training through familiarity with information that is presented "part-time."

While many improvements have occurred due to the presentation of flight data, power management remains relatively unchanged. In the fixed-wing environment, the lack of change is understandable, since power management is straightforward, manifesting simply as an ingredient that adjusts altitude or airspeed.

However, for a rotorcraft, power indication is akin to flight instrumentation in importance. Understanding power in a rotorcraft is essential to properly manage performance and maintain power situational awareness. The power required to operate a rotorcraft may substantially change during the flight path of the rotorcraft. A rotorcraft requires far more power during hover than in any other flight regime. Furthermore, the power required during hover is affected by a variety of variables, such as crosswind, air temperature, altitude, and weight.

Statistics reveal that a pilot's loss of situation awareness and the resulting exceedance of aircraft performance restrictions is among the highest causes of fatal helicopter accidents. "Reported power loss" is also among the highest causes of fatal helicopter accidents, although many of these are shown to be unsubstantiated, suggesting that perhaps the pilot did not have a true understanding of how close the power situation was to the limits of operation or authority.

SUMMARY

An exemplary embodiment of an aircraft includes an electric motor coupled to a rotor and an instrument electronically connected to the electric motor and configured to communicate a time available value before a motor condition reaches a critical condition limit, such as temperature. In an exemplary embodiment, the aircraft is a vertical takeoff and landing aircraft. In an exemplary embodiment, the rotor is an anti-torque rotor.

An exemplary method includes communicating a condition of an electric motor to a pilot during flight of an aircraft wherein the electric motor is driving a rotor and communicating to the pilot a "time available value" before the motor reaches a critical condition limit. In an exemplary embodiment, the aircraft is a vertical takeoff and landing aircraft. In an exemplary embodiment, the rotor is an anti-torque rotor.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
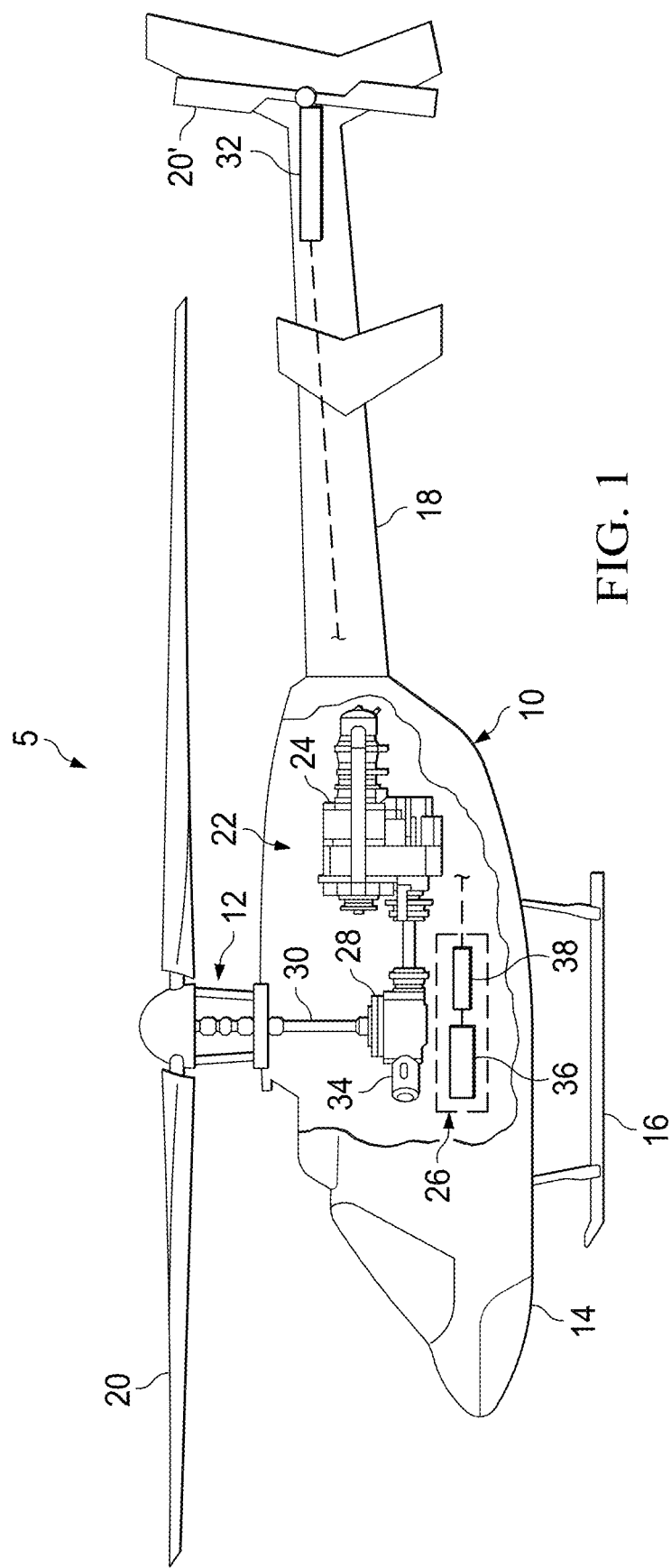
FIG. 1 illustrates a vertical takeoff and landing aircraft according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 illustrates an exemplary vertical takeoff and landing (VTOL) aircraft 10 incorporating an electric power monitoring system 5 according to an embodiment of the disclosure. VTOL aircraft 10 includes a rotor system 12, a fuselage 14, a landing gear 16, and an empennage 18. Rotor system 12 may rotate blades 20. Rotor system 12 may include a control system for selectively controlling the pitch of each blade 20 to control direction, thrust, and lift of aircraft 10. Fuselage 14 represents the body of aircraft 10 and may be coupled to rotor system 12 such that rotor system 12 and blades 20 move fuselage 14 through the air. Landing gear 16 supports aircraft 10 when aircraft 10 is landing and/or when aircraft 10 is at rest on the ground. Empennage 18 represents the tail section of the aircraft and may feature components of rotor system 12 and anti-torque rotor 20', illustrated as tail rotor blades 20'. Anti-torque rotor 20' may provide thrust in the same direction as the rotation of blades 20 to counter the torque effect created by rotor system 12 and blades 20. Teachings of certain embodiments recognize that tail rotor blades 20' may represent one example of an anti-torque rotor; other examples may include, but are not limited to, tail propellers, ducted tail rotors, and ducted fans mounted inside and/or outside the aircraft. The anti-torque system may include two or more anti-torque rotors 20', such as in an electric distributed anti-torque system.

Teachings of certain embodiments relating to rotor systems described herein may apply to rotor system 12 and/or other rotor systems, such as other tiltrotor and helicopter rotor systems. The rotor system may include an electric powered push propeller. It should be appreciated that teachings from system 5 may apply to aircraft other than VTOL aircraft 10, such as airplanes and unmanned aircraft, to name a few examples.

In accordance to an exemplary embodiment, VTOL aircraft 10 incorporates a hybrid propulsion system 22 including a combustion engine 24 and an electric propulsion system 26. In accordance with some embodiments, propulsion system 22 may be an all-electric system suitable for example for flights of limited duration.

In the illustrated example, combustion engine 24 is mechanically connected to a transmission 28 and transmission 28 is mechanically connected to blades 20 through mast 30. In accordance to an embodiment, electric propulsion system 26 includes an electric motor 32 mechanically connected to anti-torque rotor 20', a generator 34 coupled to combustion engine 24 and electric motor 32, and a controller 36 operable to receive sensor data and communicate the sensor data to a pilot. In accordance with one or more embodiments, the controller may determine and or calculate an electric propulsion system 26 condition. Controller 36 may be included in the flight computer, a component of the flight computer, and/or in communication with the flight computer. Electrical propulsion system 26 may include one or more batteries 38. Controller 36 may detect electrical propulsion system 26 conditions and in real-time determine a condition parameter, e.g., a control limit, and communicate indicators of the condition parameter to the pilot. The condition parameter(s) may be communicated to the pilot in the fuselage via visual displays, audible alerts, and/or physical cueing.

For ease of description, some of the required systems and devices operably associated with the present control system are not shown, i.e., sensors, connectors, power sources, mounting supports, circuitry, software, and so forth, in order to clearly depict the novel features of the system. However, it should be understood that the system is operably associated with these and other required systems and devices for operation, as conventionally known in the art, although not shown in the drawings.

Figure 2:
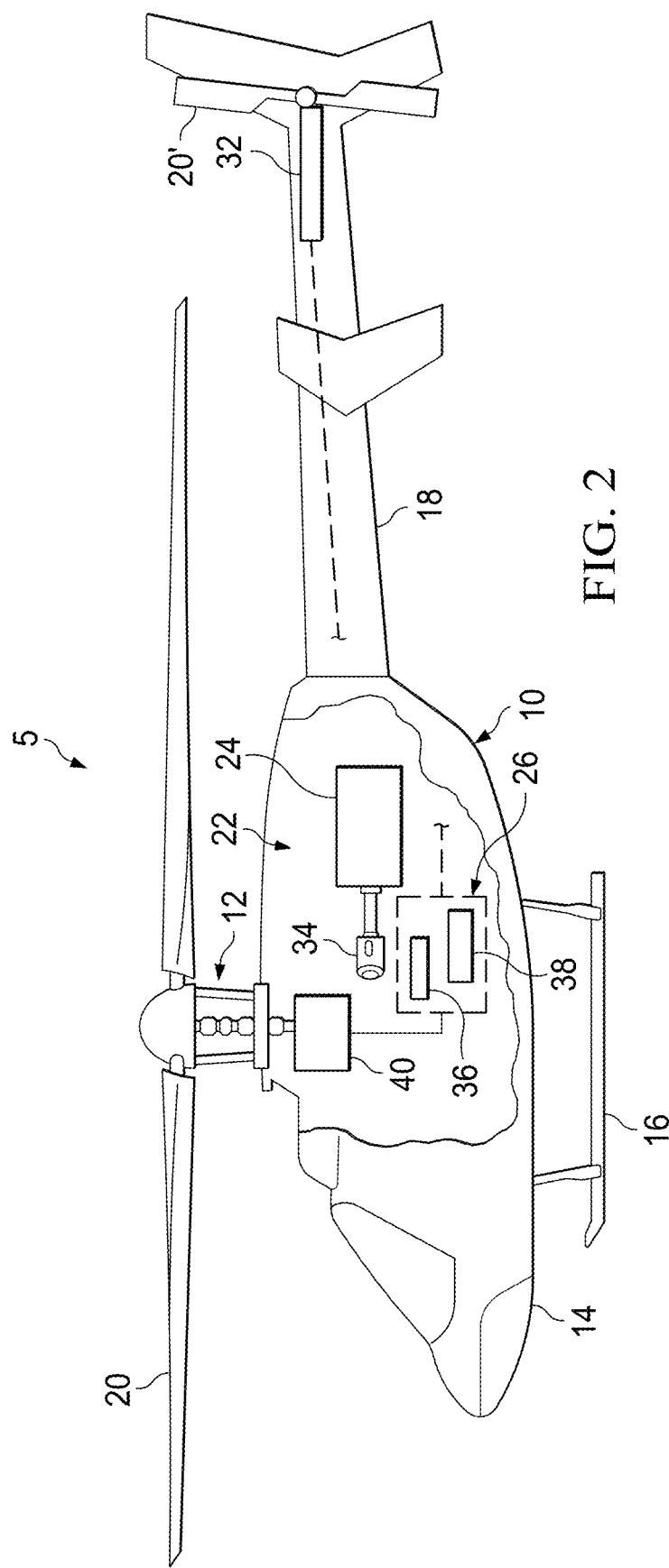
FIG. 2 illustrates another vertical takeoff and landing aircraft according to one or more aspects of the disclosure.

FIG. 2 illustrates another exemplary VTOL aircraft 10 incorporating an electric power monitoring system 5. Electric propulsion system 26 in this embodiment includes a first electric motor 32 to drive anti-torque rotor 20' and a second electric motor 40 operatively connected to mast 30 to drive blades 20. Controller 36 is operable to receive sensor data from electric propulsion system 26, in particular, electric motors 32, 40, to determine a propulsion system condition and communicate a condition parameter to the pilot. The condition parameter(s) may be communicated to the pilot via visual displays, audible alerts, and/or physical cueing.

In the FIG. 2 example, combustion engine 24 is used to power generator 34 and to recharge batteries 38. Combustion engine 24 is not mechanically coupled to rotor system 12 in the illustrated embodiment. Generator 34 is shown connected directly to combustion engine 24 although it may be connected through a transmission. Combustion engine 24 may be a smaller and a lighter-weight engine than utilized in a traditional aircraft and it may be operated at idle during a significant portion of flight operations. The weight of aircraft 10 may be significantly reduced relative to a traditional VTOL aircraft by using a lighter-weight combustion engine, less onboard fuel quantity, removal of a transmission or use of a reduced sized transmission, and removal of the anti-torque drive shaft.

Electrical propulsion systems are desirable to minimize noise, conserve energy, reduce pollution, and reduce operating costs. Effective utilization of electrical propulsion systems depends on minimizing weight. The electric motors must be designed and selected to provide sufficient power for safe flight. Electrical motors often have a peak power rating up to about two times the continuous power rating for limited time durations. Although some motors may have a high peak to continuous performance capability, the duration of the peak performance capability is typically limited by heat buildup.

More power is typically required during takeoff and hovering than in any other flight regime. Once the aircraft is in cruise mode the electrical power requirement is significantly reduced. The limited duration high power requirement of the VTOL aircraft permits selecting a smaller, lighter-weight, motor having a continuous power rating sufficient to meet the normal operating conditions and peak power capability that is sufficient to meet the short-duration high power conditions such as vertical take-off, hovering, and vertical landing. A multi-motor vertical lift aircraft may be designed to utilize peak (limited time duration) motor performance in the event that one or more of the motors fail. For example, if the remaining operable motors can operate at about 60 to 80 percent above their continuous power rating for a limited duration of time, for example, 5 to 10 minutes, the aircraft can land safely, or get to a lower (continuous power) flight condition without risk to damaging the still-operable motor(s).

To ensure safe operation, the pilot must be made aware if the remaining operable electric propulsion system 26 is operating above a continuous limit, up to the peak power condition, and the pilot must be made aware of the time available to operate at those limits. Based on the condition of the electric motor, typically temperature, the pilot can determine if a high power task, such as a vertical landing, can be performed or completed within the time available limit. For example, if aircraft 10 has been performing in high power conditions, such as repeated hovering and/or right sideward flight or crosswinds, it may be necessary for the pilot to maneuver into a lower power flight regime so that the electric motor can cool to a temperature that will permit temporary operation at the higher (peak power) condition for a short time.

Figure 3:
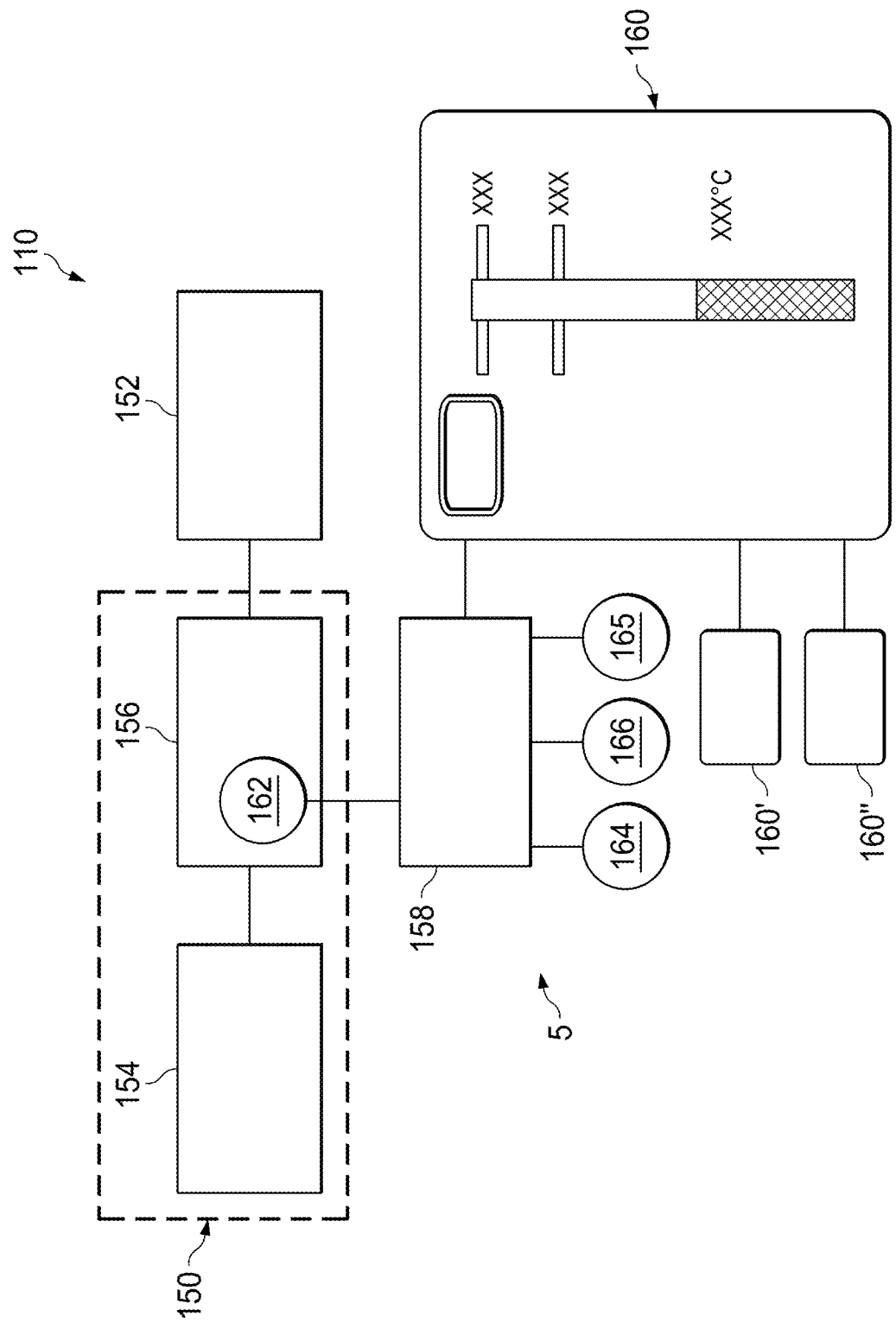
FIG. 3 schematically illustrates an aircraft incorporating a peak power use pilot monitoring system according to one or more aspects of the disclosure.

FIG. 3 is a schematic illustration of an exemplary embodiment of an electric power monitoring system 5 incorporated in an aircraft 110. Aircraft 110 may be a VTOL aircraft. Aircraft 110 includes an electric propulsion system 150 driving a rotor 152. Rotor 152 may be a main rotor (e.g., proprotor), an anti-torque rotor, or a push propeller or fan. An anti-torque rotor may include for example rotor blades, tail propellers, ducted tail rotors, and ducted fans mounted inside and/or outside the aircraft. A push propeller may be utilized for example to provide a forward thrust in a cruise or transitional mode. Electric propulsion system 150 includes an electric power source 154 and an electric motor 156. Aircraft 110 may include two or more electric motors 156. Electric power source 154 may include a generator and/or batteries.

Electric power monitoring system 5 includes a controller 158 electronically connected to motor 156 and an instrument 160 to communicate one or more electric motor conditions to the pilot of aircraft 110. Instrument 160 may convey one or more electric motor conditions visually, audibly, and or by physical cueing. The visual interface may use graphical, textual, and numerical elements and the visual interface may flash, change color, change content, appear, disappear, move or change location, or otherwise change in response to the state of the electric motor 156. Instrument 160 may be located in the fuselage 14 (FIG. 1) of the aircraft. In an unmanned aircraft 110, the electric motor condition may be configured to provide the instrument information to a remote pilot of the aircraft through telemetry. If the unmanned aircraft does not require a remote pilot, then the electric motor condition information may be processed directly by the aircraft system flying the unmanned aircraft.

Electric power monitoring system 5 includes one or more sensors configured to conduct measurements, such as and without limitation, ambient air temperature, altimeter, electric motor winding temperature, rotor torque, motor power, motor electric current, and generator load. FIG. 3 illustrates an electric motor temperature sensor 162, an ambient air temperature sensor 164, an altitude pressure sensor 166, and a sensor 167 for measuring other conditions.

Figure 4:
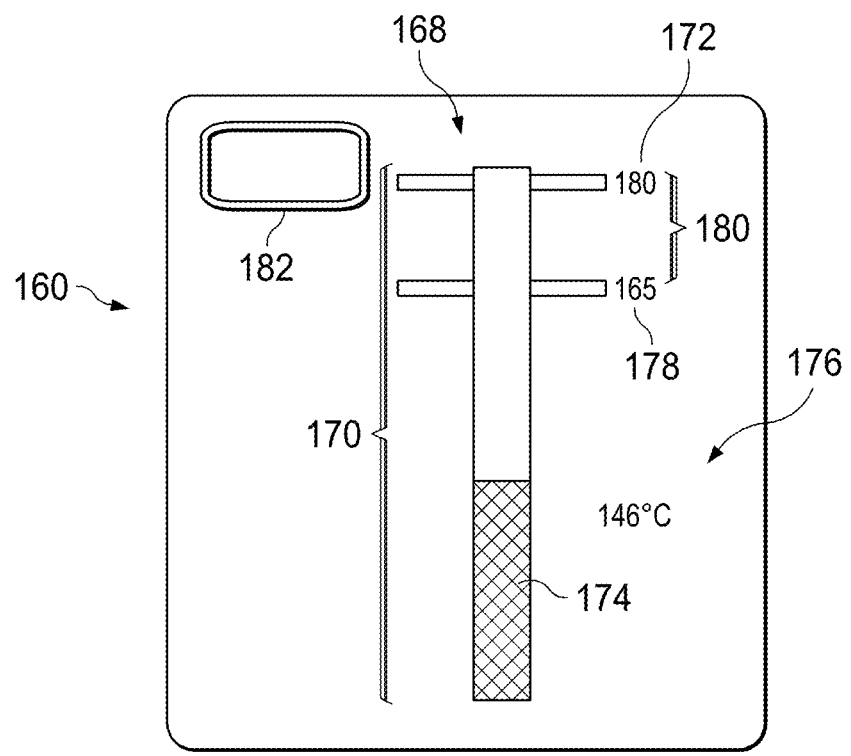
FIG. 4 illustrates an example instrument display at a first time instant according to one or more aspects of the disclosure.
Figure 5:
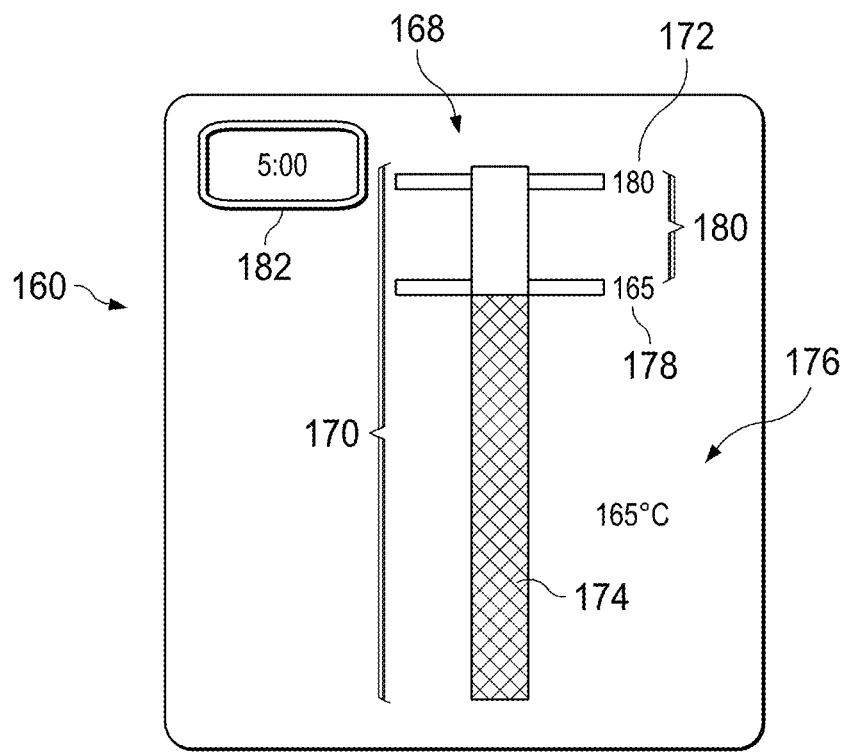
FIG. 5 illustrates an example instrument display at a second time instant according to one or more aspects of the disclosure.
Figure 6:
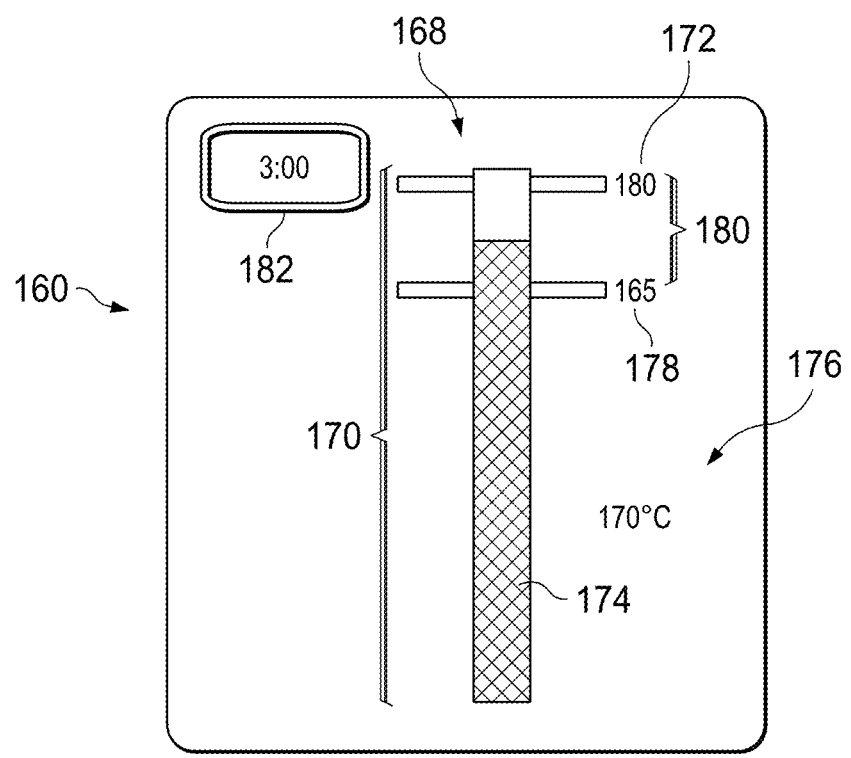
FIG. 6 illustrates an example instrument display at a third time instant according to one or more aspects of the disclosure.

FIGS. 4 to 6 illustrate an example of an instrument 160 of an electric power monitoring system at different points in time. With additional reference to FIG. 3, electric power monitoring system 5, determines a margin between a motor condition measurement and a motor condition limit at multiple time instances during the duration. The duration may be, for example, during flight of the aircraft or while the electric propulsion system is energized. The margin is the difference between the measured motor condition and the motor condition limit. A pilot alert may be initiated when the margin reaches a determined trigger limit and the pilot may be provided with an indication that permits him to determine how much time he can remain in the "above continuous power" flight condition without damaging the remaining good motor. In the illustrated examples, the electric power monitoring system is based on the temperature of the electric motor.

The windings of motor 156 will reach thermal equilibrium while operating within the motor's continuous duty capability. The temperature of motor 156 will increase as the power demand on motor 156 increases. When motor 156 is operating a peak power, the motor has a certain rate of temperature rise. The motor may fail when the temperature of the motor windings increases to a certain level. If the motor winding temperature is maintained below the continuous limit, the windings can cool off, and the motor can again be powered up to supply peak power for a limited time. The electric power monitoring system 5 alerts the pilot when a motor trigger limit is reached and a limited duration of time is available at the present motor power level before the motor damage temperature limit is reached. In this example, the time available value is associated with a temperature margin. The time available value may be decremented, visually and or audibly, so that the pilot can take timely remedial action to put the aircraft in a lower power required condition. For example, if a pilot is about to take on a sling load, the electric power monitoring system 5 can identify whether a sufficient length of time is available to complete the task. Electric power monitoring system 5 may continue to monitor motor conditions, power demand, and ambient conditions to revise the remaining time available value. It may be a particular desire to alert the pilot of a reduction in the anticipated time available value.

Instrument 160 depicted in FIGS. 4-6 is a composite display communicating electric motor information in multiple formats. Instrument 160 is a visual display and may include a speaker 160' and or a physical device 160". Examples of physical device 160" include without limitation, pedals, control stick, collective control, and cyclic control, stick. For the purpose of description, FIGS. 4-6 show motor conditions in terms of temperature and includes numeric values representing example motor conditions. The electric power monitoring system is not limited to communicating the motor conditions in temperature or to the example numeric values. The numeric value of the motor condition limit and the associated motor trigger limit may be based, for example, on electric motor catalog data, motor nameplate data, testing data, and or proprietary data associated with the use of a particular electric motor with a particular aircraft.

Instrument 160 includes a graphical display 168 of the motor 156 winding temperature measured by sensor 162. In this example, graphical display 168 is a bar display having a first region 170 illustrating temperature rise extending to a motor condition limit 172. Other forms of the graphical display may be presented, including without limitation a circular graphical display. Motor condition limit 172 may be shown in various manners, for example as an end point on graphical display 168, by a mark such as a line or an arrowhead, and or by a numeric value. In the illustrated example, motor condition limit 172 is communicated by a line and textually with a numeric value, e.g. "180."

The graphical display includes a motor condition region 174 representing the real-time motor condition reading, obtained in this example by temperature sensor 162. In accordance to an embodiment, motor condition region 174 may vary in color depending on the value of the motor condition reading relative to the motor condition limit. Instrument 160 may also include a motor condition identifier 176, textually showing the motor condition reading, e.g. "146° C." in FIG. 4.

Electric power monitoring system 5 includes a motor trigger limit 178, which may be shown on graphical display 168 in various manners, for example by a mark such as a line or an arrowhead, text, and or a color change on the graphical display. In the illustrated example, motor trigger limit 178 is depicted on graphical display 168 by a mark and textually with a numeric value, e.g. "165." Motor trigger limit 178 is a numeric value that identifies that the motor condition, e.g. motor temperature, is approaching the motor condition limit 172. Motor trigger limit 178 may be utilized by controller 158 and not directly communicated by instrument 160. Motor trigger limit 178 may be selected in various manners. For example, motor trigger limit 178 may be predetermined, prior to flight, to provide a desired initial duration for the time available at peak power from which to initiate a countdown. According to one or more embodiments, motor trigger limit 178 may be actively determined during the flight to provide a desired initial time available value at peak power. For example, the in-flight monitoring of motor 156 may indicate that the temperature rise of motor 156 is accelerating faster than estimated by the preflight motor data and controller 158 may reduce motor trigger limit 178 so that the initial time available value is at a desired value such as, and without limitation, three, five, seven, or ten minutes.

Region 180 of graphical display 168 between motor condition limit 172 and motor trigger limit 178 is a critical available motor condition margin. Available motor condition region 180 may be emphasized, when motor trigger limit 178 has been reached, by a color change, flashing, and/or other mechanisms such as an audible alert via speaker 160' or physical cueing, for example, vibration, of physical device 160". Instrument 160 may include a countdown timer 182 that shows the estimated time available value associated with available motor condition margin 180. Countdown timer 182 may periodically adjust to show the estimated time available value or continuously decrement. In addition to alerts via graphical display 168 and countdown timer 182, an audible signal such as "5 minutes of Peak Power Available" may be announced when motor trigger limit 178 is reached.

An example of operation of an aircraft 110 and an electric power monitoring system 5 is now described with reference to FIGS. 1-6. With reference to FIG. 4, the aircraft is in a cruise flight regime and electric motor 156 is operating within its continuous power rating. The logic in controller 158 is continuously reading the windings of motor 156 in real-time and communicating the real-time motor condition to the pilot via instrument 160. In FIG. 4, the real-time motor temperature is shown by motor condition region 174 of graphical display 168 communicating the motor temperature relative to motor condition limit 172. In the illustrated exemplary instrument 160, motor condition identifier 176 numerically communicates the value of the real-time motor condition. In this example, countdown timer 182 is blank indicating that motor 156 is not operating above motor trigger limit 178. In some embodiments, countdown timer 182 may display a numeric value, such as the initial countdown value, prior to the motor condition reaching motor trigger limit 178.

FIG. 5 illustrates instrument 160 at a second time instant when the temperature of motor 156 reaches motor trigger limit 178. Motor condition region 174 shows that the real-time motor temperature is at motor trigger limit 178 and motor condition identifier 176 numerically communicates the value of the measured motor temperature. In this example, countdown timer 182 turns on when the motor temperature reaches motor trigger limit 178 to provide an alert to the pilot. If countdown timer 182 was on prior to meeting motor trigger limit 178 it may begin to flash and or change color to communicate to the pilot that motor trigger limit 178 has been reached. In this example, countdown timer 182 is initiated at five minutes, however, it is noted that the countdown timer may be initiated at a different value greater or less than five minutes.

FIG. 6 illustrates instrument 160 at a third time instant as the motor condition trends beyond motor trigger limit 178 and approaches motor condition limit 172 as shown by motor condition region 174 on graphical display 168. Countdown timer 182 decrements toward 0:00 as the motor condition approaches motor condition limit 172.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft, comprising:
   an electric propulsion system comprising a motor coupled to a rotor; and
   a controller connected to the electric propulsion system to monitor a rate of temperature change of the motor, to determine an estimated time available before the temperature will reach a high-temperature limit, and to communicate the estimated time available.

2. The aircraft of claim 1, further comprising an instrument to visually communicate the estimated time available.

3. The aircraft of claim 1, further comprising an instrument to audibly communicate the estimated time available.

4. The aircraft of claim 1, further comprising a first instrument to visually communicate the estimated time available; and
   a second instrument to audibly communicate the estimated time available.

5. The aircraft of claim 1, wherein the rotor is an anti-torque rotor.

6. The aircraft of claim 1, wherein the rotor is an anti-torque rotor;
the electric propulsion system comprises a generator; and
the aircraft further comprises an instrument to visually or audibly communicate the estimated time available.

7. A method, comprising:
controlling an electric motor to fly an aircraft;
monitoring, during flight of the aircraft, a motor temperature and a rate of motor temperature change of the electric motor that is driving a rotor;
determining, based on the rate of motor temperature change, an estimated time available until the motor temperature reaches a high-temperature limit; and
communicating the estimated time available.

8. The method of claim 7, further comprising initiating communicating the estimated time available when the motor temperature exceeds a trigger limit.

9. The method of claim 7, wherein the communicating the estimated time available comprises visually displaying a countdown timer.

10. The method of claim 7, wherein the communicating the estimated time available comprises audibly communicating.

11. The method of claim 7, further comprising initiating communicating the estimated time available when the motor temperature meets a trigger limit, wherein the trigger limit is a time value.

12. The method of claim 11, comprising communicating the estimated time available to a pilot as a countdown timer.

13. The method of claim 12, further comprising adjusting the countdown timer in response to a change in the rate of motor temperature change.

14. The method of claim 7, further comprising initiating communicating the estimated time available when the motor temperature meets a trigger limit and the motor temperature is increasing, wherein the trigger limit is a time value.

15. The method of claim 14, comprising communicating the estimated time available to a pilot as a countdown timer.

16. The method of claim 15, wherein the countdown timer is a visual display.

17. The method of claim 15, comprising communicating the estimated time available to a pilot audibly.

18. The method of claim 7, wherein the aircraft is a helicopter and the rotor is an anti-torque rotor.

19. The method of claim 18, further comprising initiating communicating the estimated time available when the motor temperature meets a trigger limit and the motor temperature is increasing, wherein the trigger limit is a time value.

20. The method of claim 19, further comprising communicating the estimated time available to a pilot as a countdown timer, and
adjusting the countdown timer in response to a change in the rate of motor temperature change.

* * * * *